No. 668,306. Patented Feb. 19, 1901.
A. COLLETTE, FILS & A. BOIDIN.
APPARATUS FOR THE MANUFACTURE OF ALCOHOL.
(Application filed Sept. 26, 1898.)
(No Model.) 4 Sheets—Sheet 1.
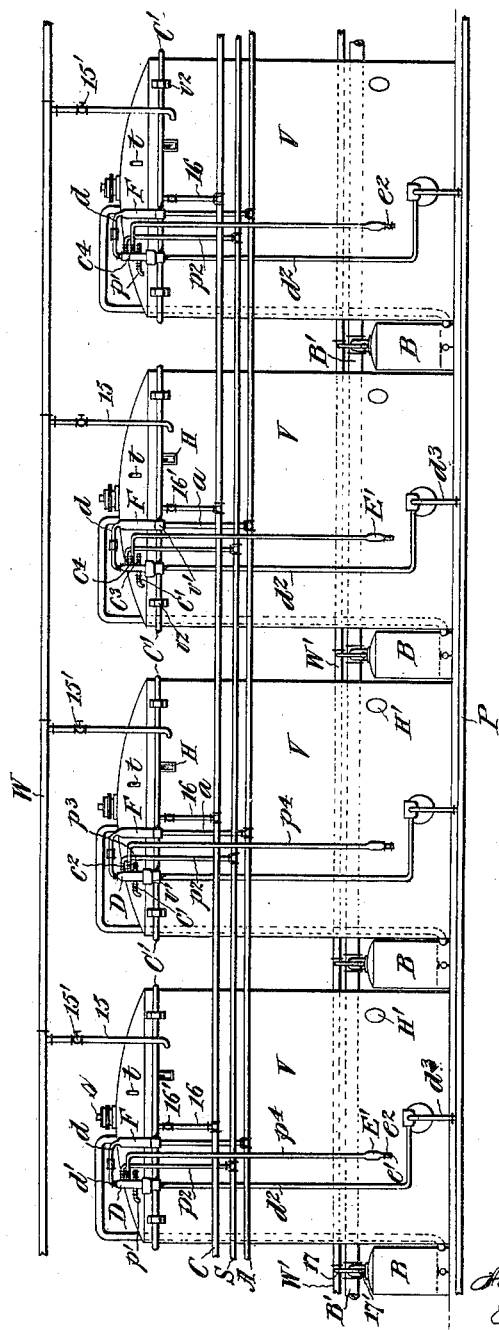

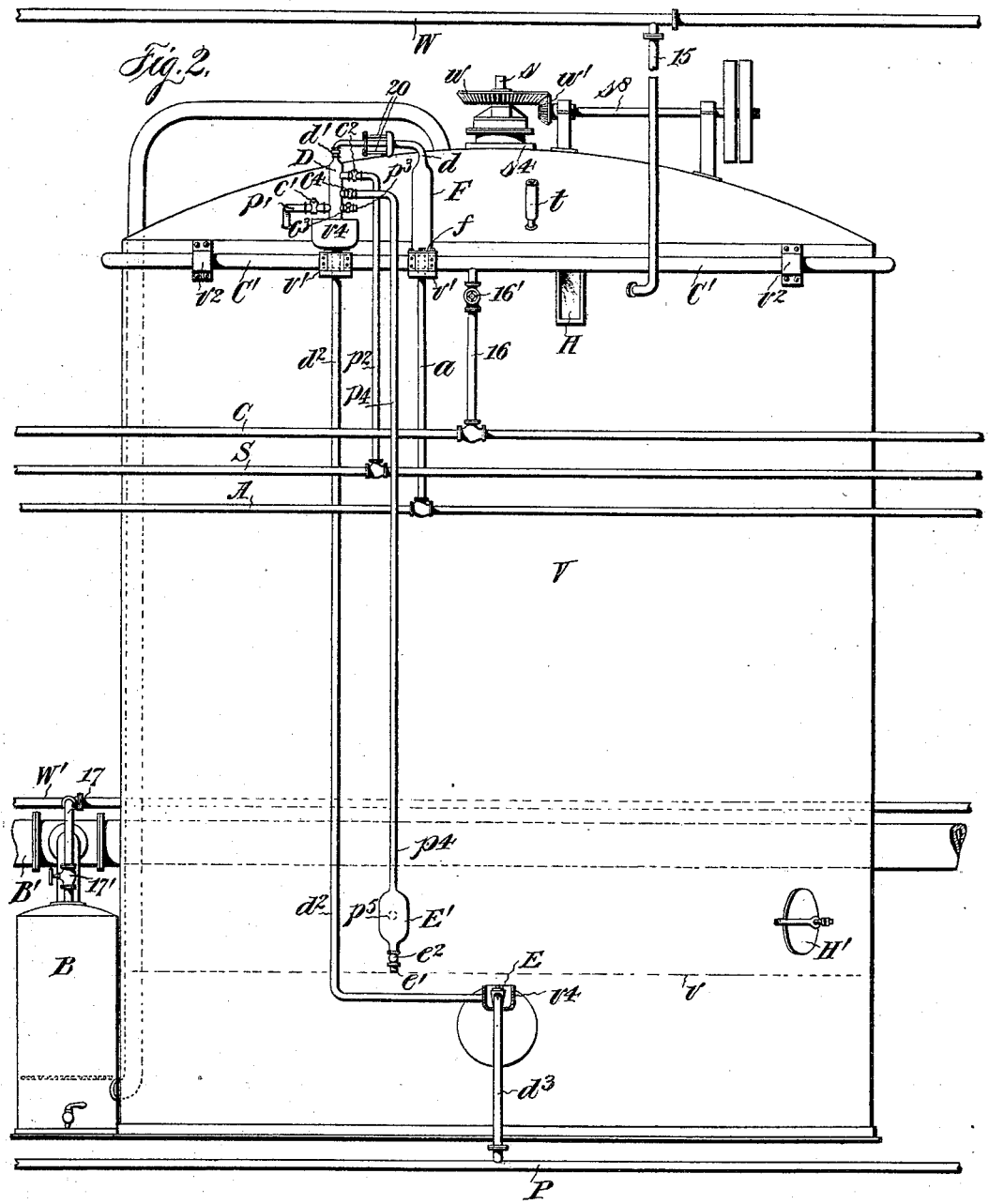

No. 668,306. Patented Feb. 19, 1901.
A. COLLETTE, FILS & A. BOIDIN.
APPARATUS FOR THE MANUFACTURE OF ALCOHOL.
(Application filed Sept. 26, 1898.)
(No Model.) 4 Sheets—Sheet 3.
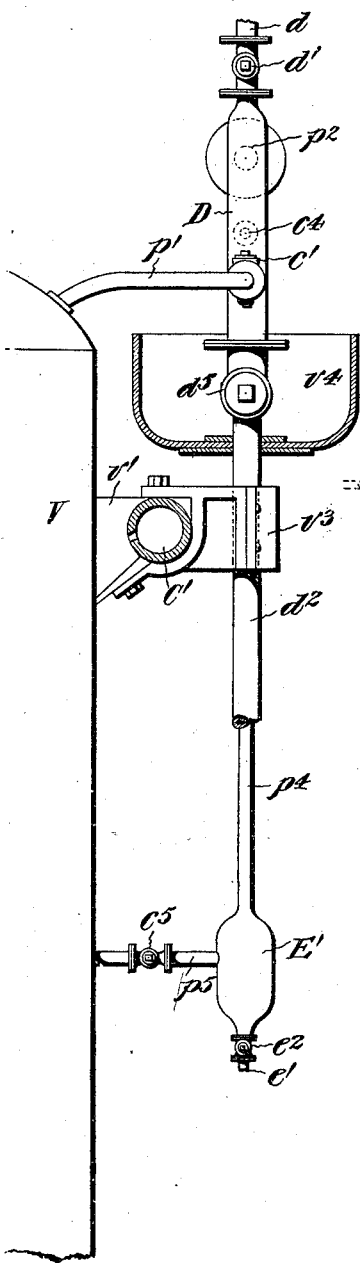
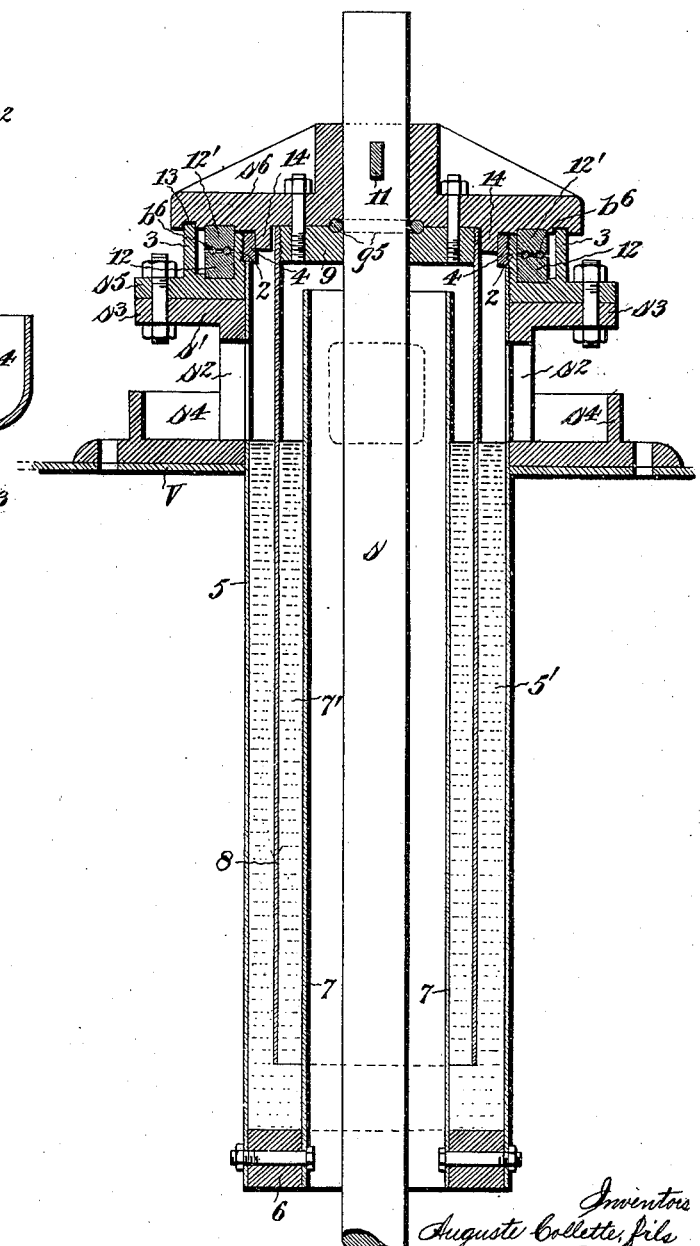

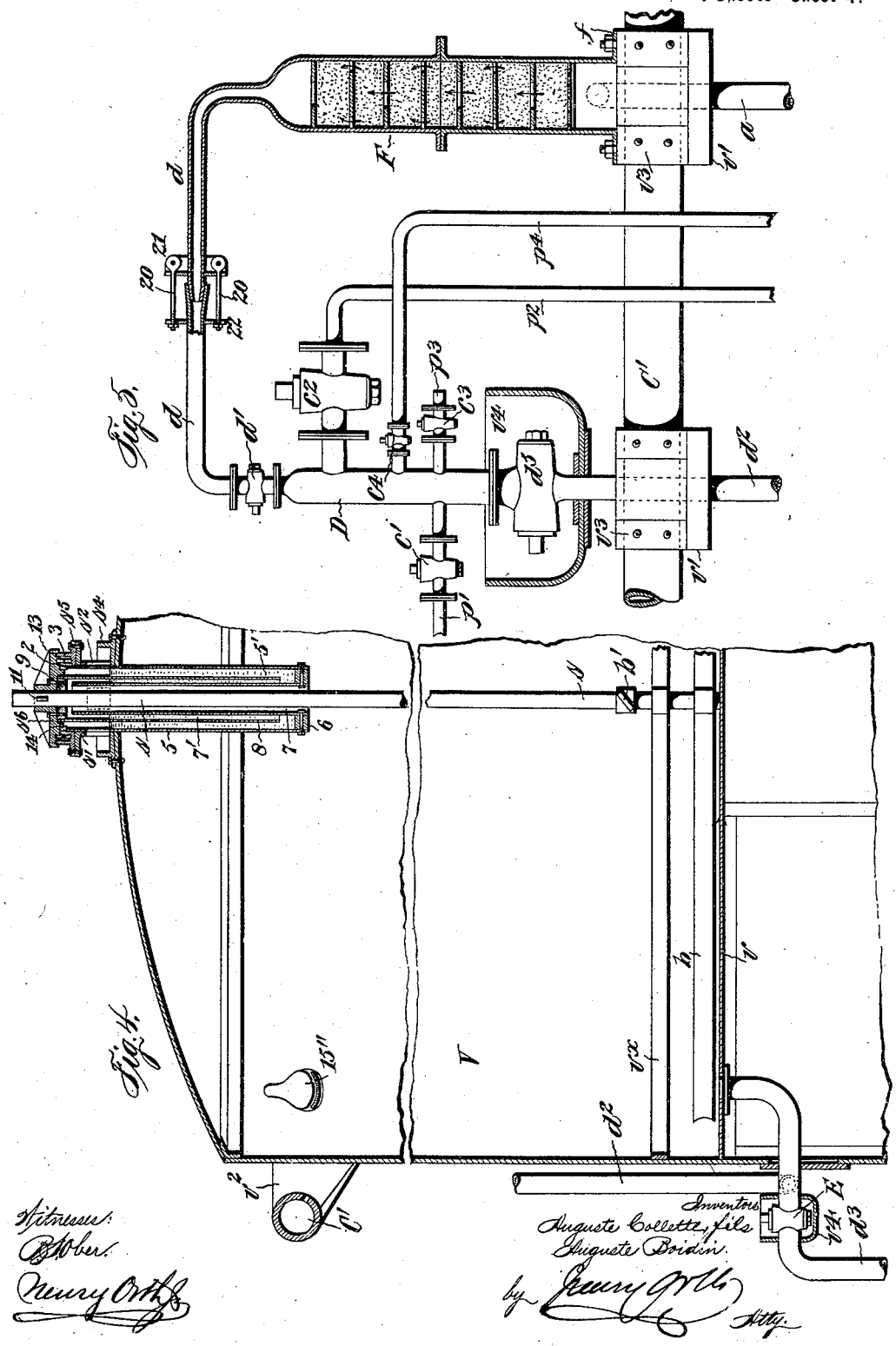

UNITED STATES PATENT OFFICE.

AUGUSTE COLLETTE, FILS, AND AUGUSTE BOIDIN, OF SECLIN, FRANCE.

APPARATUS FOR THE MANUFACTURE OF ALCOHOL.

SPECIFICATION forming part of Letters Patent No. 668,306, dated February 19, 1901.

Application filed September 26, 1898. Serial No. 691,962. (No model.)

*To all whom it may concern:*

Be it known that we, AUGUSTE COLLETTE, Fils, distiller, and AUGUSTE BOIDIN, chemist, citizens of the Republic of France, residing at Seclin, Nord, in the Republic of France, have invented certain new and useful Improvements in Apparatus for the Manufacture of Alcohol by Saccharification and Fermentation by Means of Mucedineæ, of which the following is a specification.

This invention has relation to the saccharification and fermentation of distillers' wort by means of mucedineæ, as described in our Patent of the United States of March 28, 1899, No. 621,796, and our present invention relates more particularly to improved apparatus whereby the said processes may be effectually and economically practiced, as will now be fully described, reference being had to the accompanying drawings, in which—

Figure 1 is a front elevation of so much of a plant as will be necessary to a clear understanding of our invention. Fig. 2 is a front elevation of one of the saccharifying and fermenting tuns or vats and the various line-pipes and connections, Fig. 3 being a fragmentary side elevation, and Fig. 4 a fragmentary vertical section, thereof. Fig. 5 is a sectional detail elevation of the air-filter and fluid-distributer mounted on the spray-pipe for cooling the fermenting and saccharifying vats; and Fig. 6 is a detail vertical section of the stuffing-box for the agitator-shaft of said tuns, Figs. 2 to 6 being drawn to an enlarged scale.

In the patent hereinabove referred to we have called particular attention to the fact that the operation of saccharification and fermentation should be carried on in such a manner as to avoid adventitious micro-organisms from polluting the wort and interfering with the proper propagation of the mucedineæ and giving rise to a loss of alcohol, and our present invention is more especially directed to means for guarding against such pollution of the wort.

Referring now to the drawings, we have shown in Fig. 1 a battery of four saccharifying and fermenting vats V, though we do not desire to limit ourselves thereto, as the number of vats may be increased or reduced in accordance with the capacity of the distillery and according as the process of saccharification and fermentation is to be continuous or otherwise. In the patent referred to we have also called attention to the fact that after sowing the wort with mucedineæ the former should be so agitated as to keep the mucedineæ constantly immersed in order to prevent surface-cultivation and therethrough a rapid and thorough propagation of the micro-organism. To this end the vats V, as more clearly shown in Fig. 4, have their bottoms $v$ raised above their foot-flanges or bases, and above said bottom is arranged a spider $v^\times$, constructed with an axial bearing for and in which revolves the stirrer-shaft $s$, that carries a series of stirrer-blades $b\ b'$, preferably so inclined in a well-known manner relatively to a vertical as to cause the wort to circulate in a spiral path in the vat upwardly and downwardly. The stirrer-shaft $s$ extends through a liquid-sealed stuffing-box constructed as follows to effectually exclude adventitious micro-organisms from the vat, reference being more particularly had to Figs. 4 and 6.

$s'$, Fig. 6, indicates a sleeve or cylinder having a number of openings $s^2$, an upper circular bolt-flange $s^3$, and a similar lower cup-shaped bolt-flange $s^4$, which latter is bolted to the convex top of the vat V, which has an opening corresponding with the bore of said sleeve. To the sleeve $s'$ is bolted a disk $s^5$, having concentric vertical flanges 2 and 3, flange 2 being screw-threaded internally and having screwed thereto a ring 4, to which is secured the upper end of a cylinder 5, preferably of sheet metal and having openings in register with the openings $s^2$ in sleeve $s'$. The lower end of cylinder 5 is closed fluid-tight by means of a ring 6 and a second open-ended cylinder 7, said ring being bolted to said cylinders 5 and 7, as shown. A third shorter cylinder 8, open at its lower end and secured to a disk 9 at its upper end, extends into the space between cylinders 5 and 7 nearly to the ring 6, dividing said space into two concentric chambers 5' and 7', respectively, filled with a sealing liquid, as water, up to about the bottom of the cup-shaped flange $s^4$ on sleeve $s'$, so as to permit the liquid seal to rise and fall under varying pressures in the vat V without overflowing, such liquid being of course supplied to the chambers 5' and 7' through said cup-shaped flange $s^4$. The disk 9, to which cylinder 8 is secured, is bolted to a circular cap-plate $s^6$, and both have an axial passage and a bearing, respectively, for the stirrer-shaft $s$, which latter is keyed to said cap-plate, as shown at 11. Between the inner and outer flanges 2 and 3 of disk $s^5$ is formed a circular seat for a ring 12, a corresponding ring 12' being seated in the under face of cap-plate $s^6$, both rings having circular tracks for balls $b^6$, thus providing a ball-bearing for said cap-plate, both rings having bearing on the inner flange 2 of disk $s^5$. The cap-plate $s^6$ has, furthermore, a circular groove 13 in the under face, into which projects the outer circular flange 3 on disk $s^5$, whereby said cap-plate is properly guided and held against lateral displacement, and on said under face of cap-plate $s^6$ is formed a circular flange 14, which fits between the collar or ring 4 of cylinder 5 and the upper end of cylinder 8. Finally the disk 9 has in its upper face about the axial shaft-passage a circular seat for a packing-gasket $g^5$.

By means of the construction of the stuffing-box described access of adventitious micro-organisms to the vat V is effectually prevented.

The stirrer-shaft $s$ of the several vats carries at its upper end a bevel-wheel $w$, Fig. 2, in gear with a pinion $w'$ on a counter-shaft $s^8$, carrying a loose pulley and a fast pulley adapted to be belted to an overhead line-driving shaft. (Not shown in the drawings.)

Each vat V is provided in its convex top with a seeding-tube having secured thereto a flexible tube $t$, Figs. 1 and 2, which is closed during saccharification and fermentation by any suitable means—as, for instance, a Mohr clamp—and through which the mucedineæ are introduced.

Above the vats V is arranged the wort-feed main W, Fig. 1, connected with the several vats through branches 15, having stop-cocks 15', and entering their respective vats near the upper end, the discharge end 15'' of said branch pipes being inclined downwardly and fan-shaped, as shown in Fig. 4, so as to prevent wort from accumulating therein and choking up the branch pipes.

Each vat V has bolted thereto a number of brackets $v^2$, Figs. 1 and 2, that support an annular perforated or spray pipe C', connected by a branch pipe 16, provided with a stop-cock 16', with a line-pipe C for supplying a cooling agent, as cold water, to said spray-pipes C'. Each vat V is, furthermore, connected with an air-supply main A and with a steam-supply main S, as follows: The air-main A is connected to the inlet of an air-filter F of well-known construction and the steam-main S with a fluid-distributer D, through branch pipes $a$ and $p^2$, respectively, the latter having a stop-cock $c^2$. The outlet of the air-filter F is likewise connected to the distributer D through a pipe $d$, provided with a stop-cock $d'$, and said distributer is, furthermore, connected with the vat V through a branch pipe $p'$, provided with a stop-cock $c'$. The distributer D is also provided with a blow-off branch $p^3$, having a stop-cock $c^3$. The pipe $d$, Fig. 5, that connects the filter F with the distributer D, we preferably make of two sections having interfitting conical terminals, said pipe-sections being coupled together by means of tightening-bolts 20, pivoted to a flange on a collar 21, secured to one of said pipe-sections and seating in radial slots in a collar 22 on the other pipe-section, and by means of nuts on said bolts, as clearly shown in Fig. 5. By means of this arrangement the filter F can be readily disconnected from the distributer D. The distributer D is also connected, through a pipe $d^2$, having stop-cock $d^5$, with a pipe $d^3$, connected with the vat V through its bottom and having a three-way cock E, said pipe $d^3$, Fig. 2, being a branch from a discharge-main P which in practice is connected with a pump, (not shown,) whereby the fermented wort is or may be pumped into the still or stills or into a storage-tank. Finally, the distributer is connected by a pipe $p^4$, Figs. 2 and 3, having a stop-cock $c^4$, with a sampling-bulb E', Figs. 1 to 3, which bulb is connected with the vat V through a pipe $p^5$, provided with a stop-cock $c^5$, and said bulb E' has a discharge branch $e'$, provided with a stop-cock $e^2$.

The distributer D and air-filter F are preferably and conveniently supported from brackets $v'$, bolted to the vat V and having a bearing for the spray-pipe C', Figs. 3 and 5, said brackets having likewise a bearing for the pipes $a$ and $d^2$ of the air-filter F and distributer D, secured to said brackets by cap-plates $v^3$, the foot-flange $f$ of the filter F being bolted to its bracket, so as to be readily removed therefrom when this becomes necessary.

Each vat has near its upper end a glazed sight-aperture H for observing the growth or propagation of the mucedineæ, and near its bottom the vat is provided with a manhole H' for obvious purposes.

Wherever practicable, all the stop-cocks are in practice surrounded by a vessel containing an antiseptic liquid, and as an example the stop-cocks $d^5$ and E are shown as arranged in such a vessel $v^4$, Figs. 2, 3, and 5.

The saccharification and fermentation of the wort are carried out as follows: The vats V are to be sterilized before introduction of the wort, and as this operation is the same for each vat we will confine the description thereof to one of the vats. The stop-cock $d'$ of the connection between the air-filter F and distributer D and the blow-off cock $c^3$ of said distributer are closed, as well as the discharge-cock $e^2$ of sampling-bulb E' and the cock 16' of water-main branch 16. The three-way cock E in the connections between the distributer and the discharge-main P being set to establish communication between the vat V, the main P, and the distributer, while the stop-cocks $c'$ $c^2$ $c^4$ $c^5$ $d^5$ and the seeding-tube are opened, the scrubbers B being supplied with water from main W' and branch 17, stop-cock 17' being closed. Steam, preferably superheated, flows, therefore, from main S through pipe $p^2$ to distributer and is therethrough distributed throughout all the connections with the vat V, so that even the pumps connected with the feed and discharge mains W and P can be sterilized, and this is accomplished by the single distributing device D. When the pressure in the vat becomes greater than that exerted by the water in the scrubber B, the blow-off cock $c^3$ is opened, so as to regulate the pressure, and when all the connections with the vat have been heated to a sterilizing temperature and kept at this temperature a sufficient time to insure the destruction of micro-organisms the wort is fed to the vat.

In our patent hereinbefore referred to we have stated that the wort should also be sterilized before it is sown with the mucedineæ. This we prefer to do before it is fed to the vat in a vessel in which the wort after leaving the boilers or cookers is fluidified, said wort being then forced through feed-main W by means of a pump into the vats. Of course it will be readily understood that this sterilization and even the fluidification of the wort could be carried out in the vats themselves by simply providing therein a heater-coil connected with the steam-main and with the atmosphere, respectively; but, as stated, we prefer to take the wort at sterilizing temperature direct from the liquefier or liquefiers. Before the wort-feed pump (not shown) is started the stop-cocks $c^2$ $c^5$ $d^5$ and the seeding-tube are closed, while the discharge-cock $e^2$ of the sampling vessel E' is opened and the blow-off cock set to allow the steam to flow out of vat V as it is displaced by the incoming wort, the three-way cock E being set to cut off communication between pipes $d^3$ and $d^2$. The feed-pump being started, the vat will gradually fill with wort and drive out the steam until the vat is filled with wort to its dome or so that it can be seen through the sight-hole H. All the stop-cocks described are now closed and the stop-cock 16' in the water-main branch 16 is opened to admit water from main C to spray-pipe C'. This is continued until the wort in vat V has been cooled down to the temperature most favorable to the propagation of the mucedineæ, the stirrer-shaft $s$ having meanwhile been set in motion. In order that this cooling down of the wort may readily be determined, each vat is provided, as usual, with a thermometer. (Not shown.) The supply of water is then cut off and the stop-cock $d'$ in connection between air-filter F and distributer D and the stop-cock $d^5$ are opened and the three-way valve E set to establish communication between the vat and pipe $d^2$ and cut off communication between pipes $d^3$ and P, whereby sterilized air under pressure and the oxygen necessary to the growth and propagation of the mucedineæ is supplied to the wort, the ferment being now introduced into the vat through seeding-tube $t$, which is then closed again. The propagation of the mucedineæ and therethrough the saccharification and fermentation of the wort will now proceed rapidly, and the progress may be determined by examining samples of the wort. This is done by opening stop-cock $c^5$, allowing wort to flow under the pressure in the vat into the sampling vessel E', which is preferably made or partially made of glass, and when a suitable quantity of the wort has flowed into said vessel the stop-cock $c^5$ is closed and the stop-cock $c^4$ and then the stop-cock $e^2$ are opened, whereby the contents of vessel E' are discharged under the pressure of air from filter F into a suitable vessel held under discharge-pipe $e'$, both cocks being again closed after the discharge. Of course the pressure in the vat V is at all times equal to the pressure exerted by the water in the scrubber B, the carbonic-acid gas generated during fermentation being forced through the water into gas-main B', from which it may be taken to a gas-holder and may then be liquefied. Any alcohol entrained by the carbonic-acid gas will be dissolved or absorbed by the water in the scrubber, which water is drawn off from time to time and the alcohol recovered therefrom in any desired manner. Should the temperature in the vat fall below that most favorable to the propagation of the mucedineæ, steam can be admitted through pipe $d^2$, as above described, and through pipe $p'$, in which case the air-supply is or is not cut off, as necessity may require.

From the above description and the arrangement of the connections with the vats V, it will readily be understood how the process of fermenting distillers' wort can be carried on continuously, since each vat can be cut off from all the mains or line-piping whenever this is desired, so that in one or more of the vats fermentation can proceed, while from one or more vats the fermented liquor is drawn off and pumped into a still or stills or into a storage tank or tanks.

Having thus described our invention, what we claim as new therein, and desire to secure by Letters Patent, is—

1. A fermenting plant, comprising a plurality of fermenting-vats each provided with stirring appliances, means for introducing the ferment, and pipes for feeding wort to the vats and discharging the fermented liquor, pipes for supplying steam and sterilized air to said vats, a spray-pipe encircling the upper end of each vat, and a scrubber for each of said vats; in combination with wort-feed, steam, air, water and discharge mains connected with the corresponding vat-pipes, and cut-off devices for cutting off the connections between said mains and any one of the vats, for the purpose set forth.

2. A fermenting plant, comprising a plurality of fermenting-vats each provided with a revoluble stirrer, mechanism for revolving the stirrers of all the vats, means for stopping the rotation of the stirrer of any one of said vats, means for introducing the ferment and pipes for feeding wort to the vats and discharging the fermented liquor, pipes for supplying steam and sterilized air to said vats, a spray-pipe encircling the upper end of each vat, and a scrubber for each of said vats; in combination with wort-feed, steam, air, water and discharge mains connected with the corresponding vat-pipes, and cut-off devices for cutting off the connections between said mains and any one of the vats, for the purpose set forth.

3. The combination with a fermenting-vat, means for supplying the same with wort, and ferment, and air and steam mains; of a fluid-distributer connected with the upper and lower ends of the vat and with the steam-main, and an air-filter connected with said distributer and with the air-main, and suitable stop-cocks in said connections whereby steam or air or both can be supplied to the vat at its upper or at its lower end or at both ends, for the purpose set forth.

4. The combination with a fermenting-vat, means for supplying the same with wort and ferment, and air and steam mains; of a fluid-distributer provided with a blow-off branch and connected with the steam-main and with the upper and lower ends of the vat, an air-filter connected with the air-main and with said distributer, and suitable stop-cocks in said connections whereby steam or air or both can be supplied to the vat either to its upper or to its lower end or to both ends, for the purpose set forth.

5. The combination with a fermenting-vat and a fluid-distributer connected therewith at top, of a sampling vessel having a valved discharge-pipe and valved pipes connecting said vessel with the aforesaid distributer and with the fermenting-vat near its lower end, for the purpose set forth.

6. The combination with a fermenting-vat, means for supplying the same with wort and ferment, and air and steam mains; of a fluid-distributer provided with a blow-off branch and connected with the steam-main and with the upper and lower ends of the vat, an air-filter connected with the air-main and with said distributer, a sampling vessel and distributer, and suitable stop-cocks in said connections whereby steam or air or both can be supplied to the vat either to its upper or to its lower or to both ends, and whereby steam or air or both can be passed through the sampling vessel, for the purposes set forth.

In witness whereof we have hereunto signed our names, this 17th day of August, 1898, in the presence of two subscribing witnesses.

AUGUSTE COLLETTE, Fils.
AUGUSTE BOIDIN.

Witnesses:
PAUL DE GUYDT,
ALBERT CALMETTE.